(12) United States Patent
Lennen

(10) Patent No.: US 6,404,801 B1
(45) Date of Patent: *Jun. 11, 2002

(54) METHOD FOR SATELLITE TRACKING AND EXTRACTING THE SIGNAL BY CORRELATION

(75) Inventor: Gary R. Lennen, Cupertino, CA (US)

(73) Assignee: Trimble Navigation, LTD, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/175,602

(22) Filed: Oct. 19, 1998

Related U.S. Application Data

(62) Division of application No. 08/580,353, filed on Dec. 28, 1995, now Pat. No. 5,825,887.

(51) Int. Cl.[7] .............................................. H04L 27/30
(52) U.S. Cl. ........................................ 375/134; 342/357
(58) Field of Search ................................. 375/134, 137, 375/142, 145, 149, 259, 326, 343; 701/13, 213, 215; 342/352, 356, 357, 450; 370/316; 455/13.2, 427, 12.1, 98

(56) References Cited

U.S. PATENT DOCUMENTS

| | | | | |
|---|---|---|---|---|
| 5,204,903 A | * | 4/1993 | Okada et al. ................. 380/46 |
| 5,293,170 A | * | 3/1994 | Lorenz et al. .............. 342/352 |
| 5,473,696 A | * | 12/1995 | Breemen et al. .............. 380/49 |
| 5,736,961 A | * | 4/1998 | Fenton et al. ............... 342/357 |
| 5,825,887 A | * | 10/1998 | Lennen ........................ 380/341 |
| 6,061,390 A | * | 5/2000 | Meehan et al. ............. 375/208 |

* cited by examiner

Primary Examiner—Chi Pham
Assistant Examiner—Emmanuel Bayard
(74) Attorney, Agent, or Firm—Boris G. Tankhilevich

(57) ABSTRACT

The apparatus and method of the present invention is designed to receive SATPS satellites encoded information using a high gain antenna and pre-process the encoded information. The apparatus includes a High Gain Antenna (HGA), an extracting receiver, and a transmitter circuit configured to transmit the unknown code modulated on a transmission frequency for further processing in the delayed correlation receiver.

9 Claims, 7 Drawing Sheets

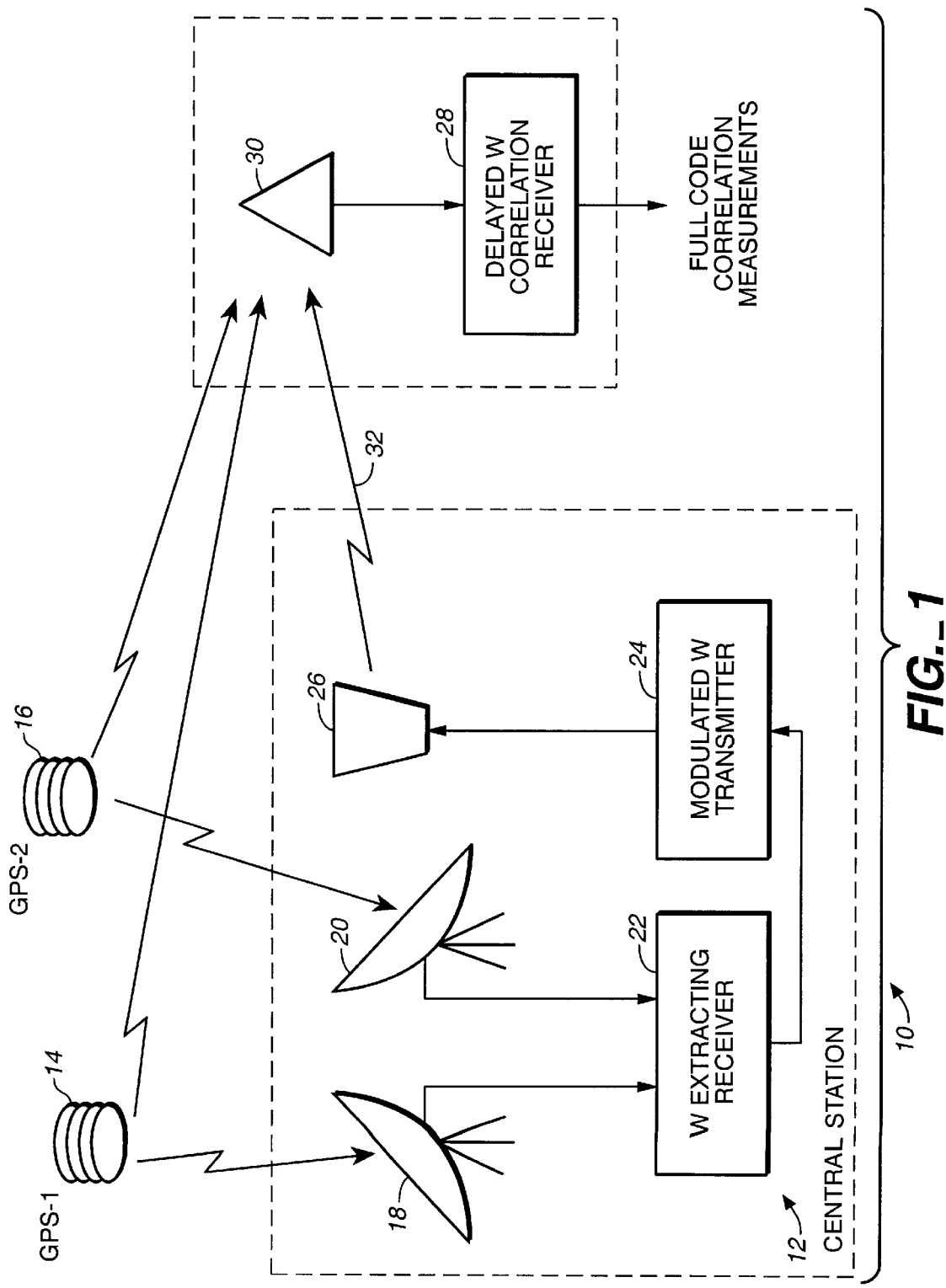
FIG._1

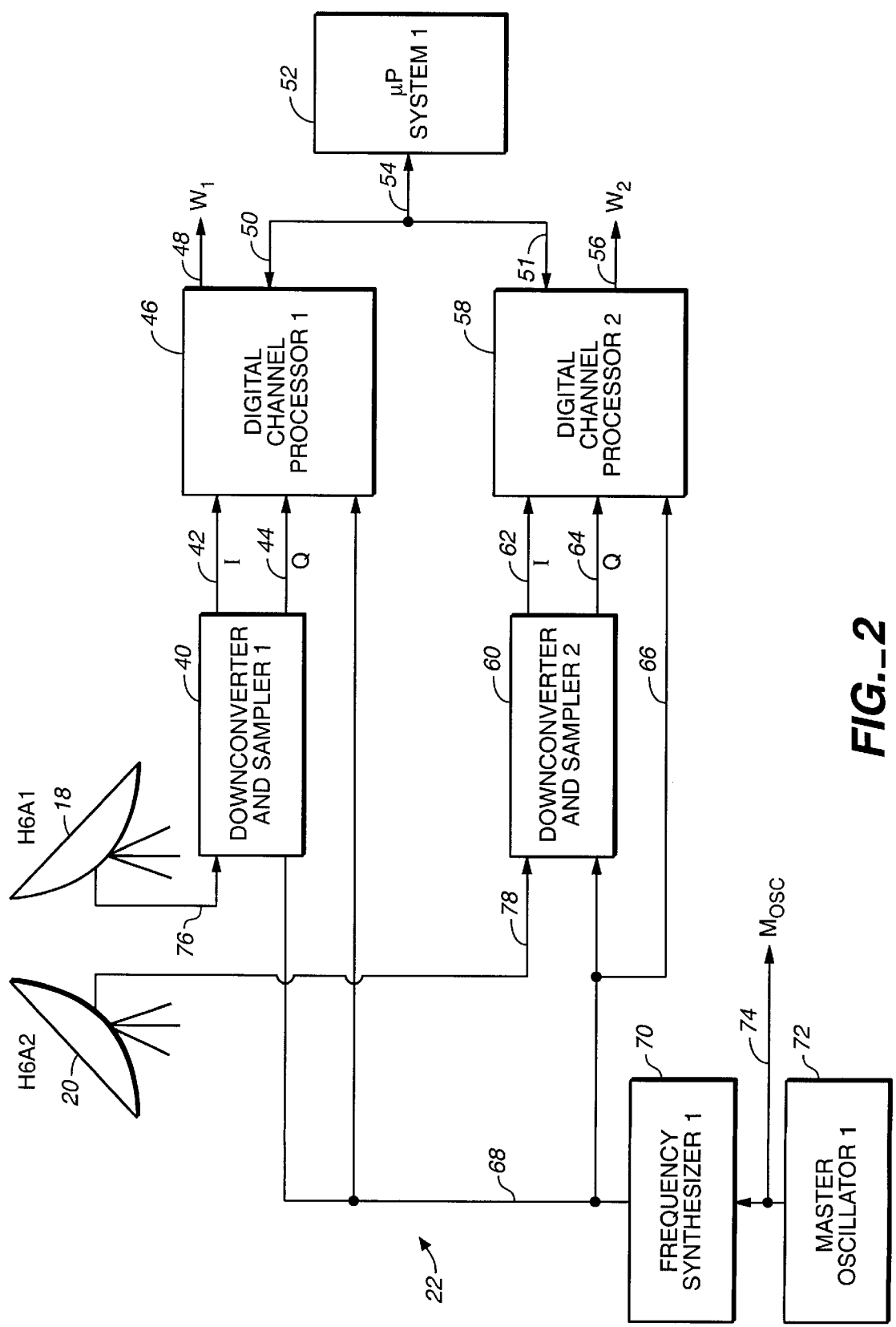
FIG._2

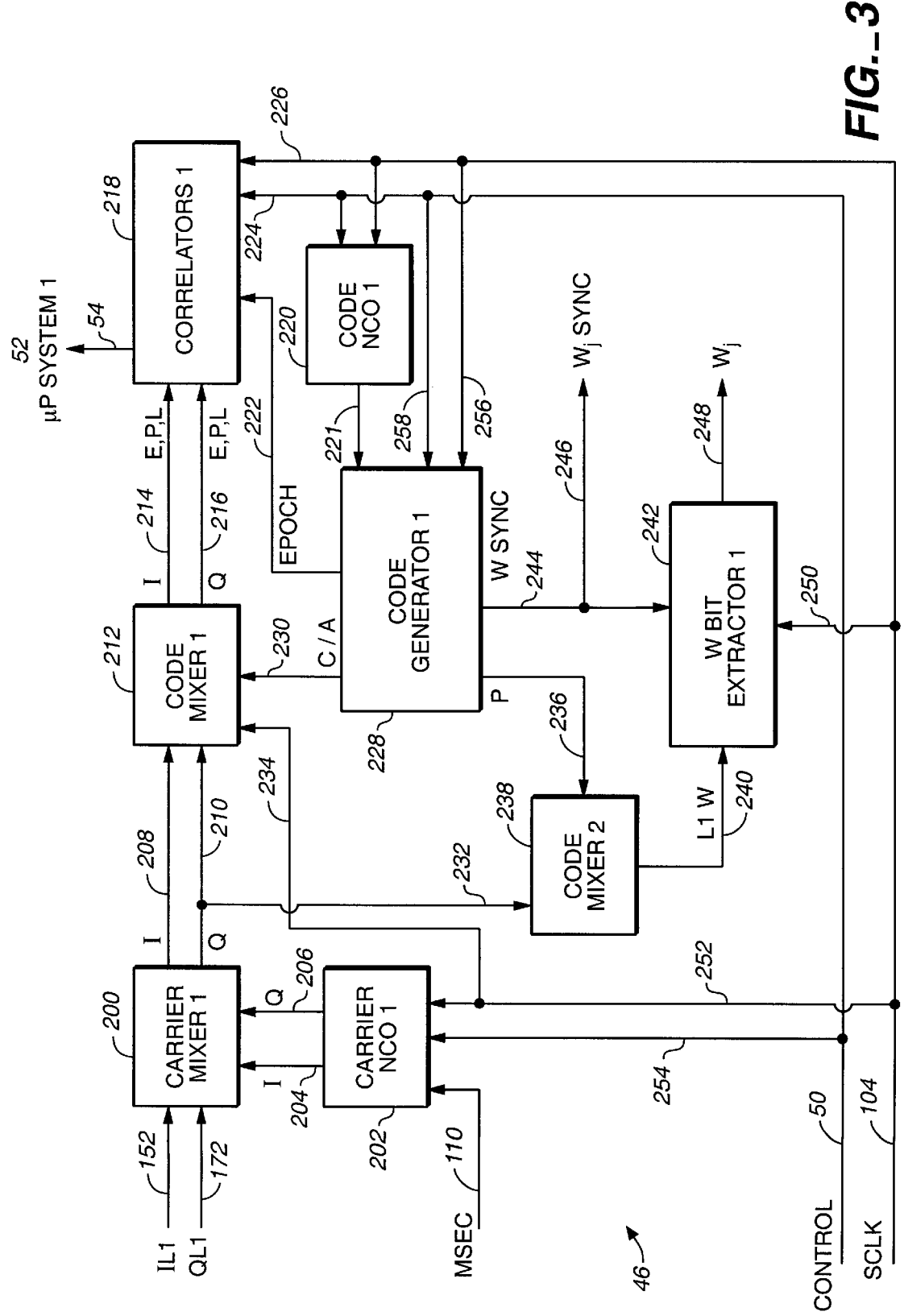
FIG._3

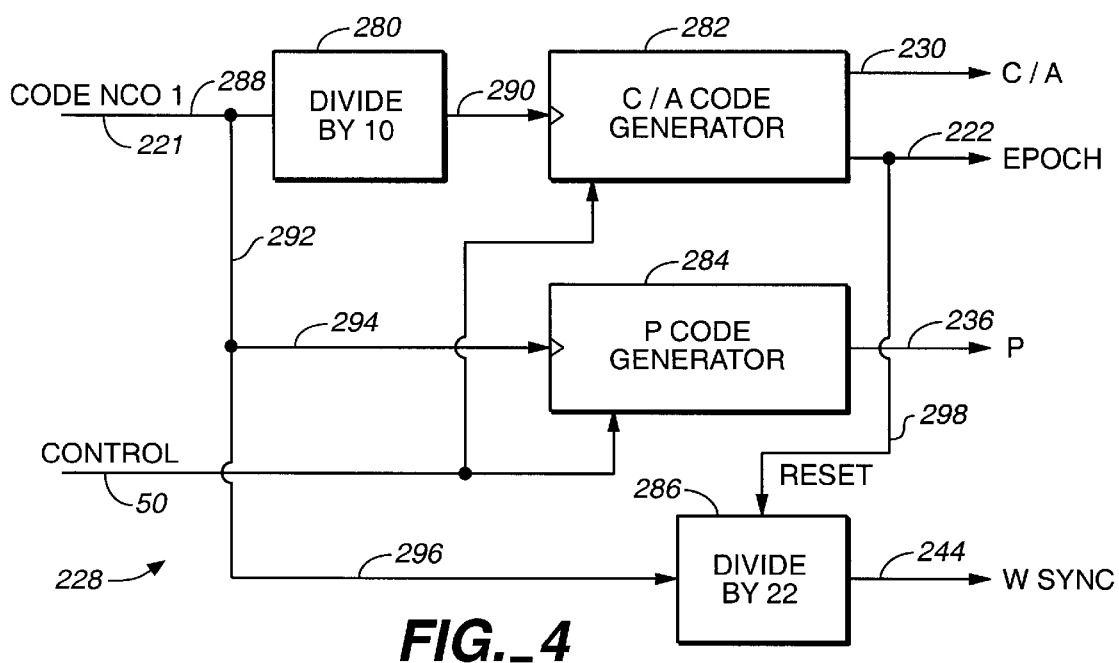
FIG._4
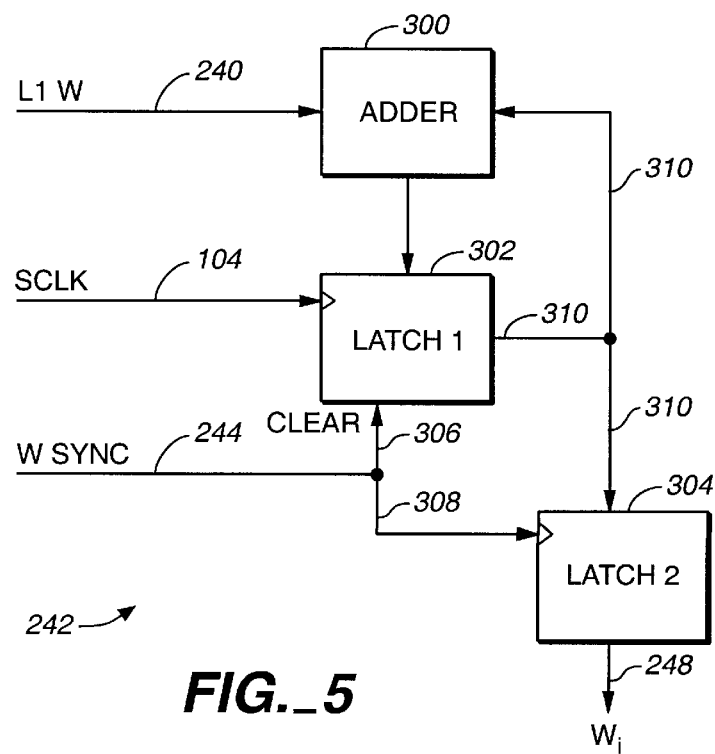
FIG._5

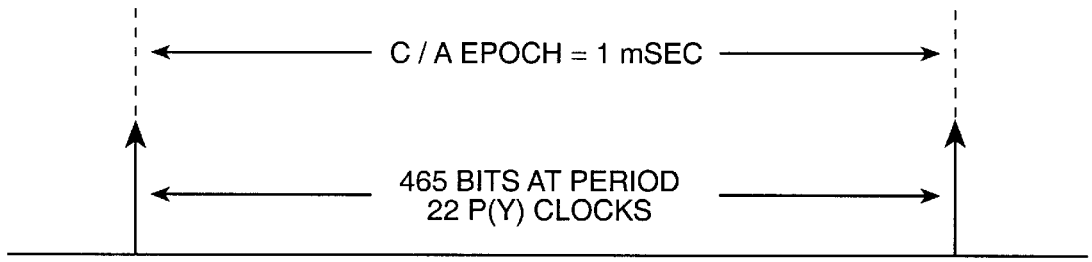
FIG._6
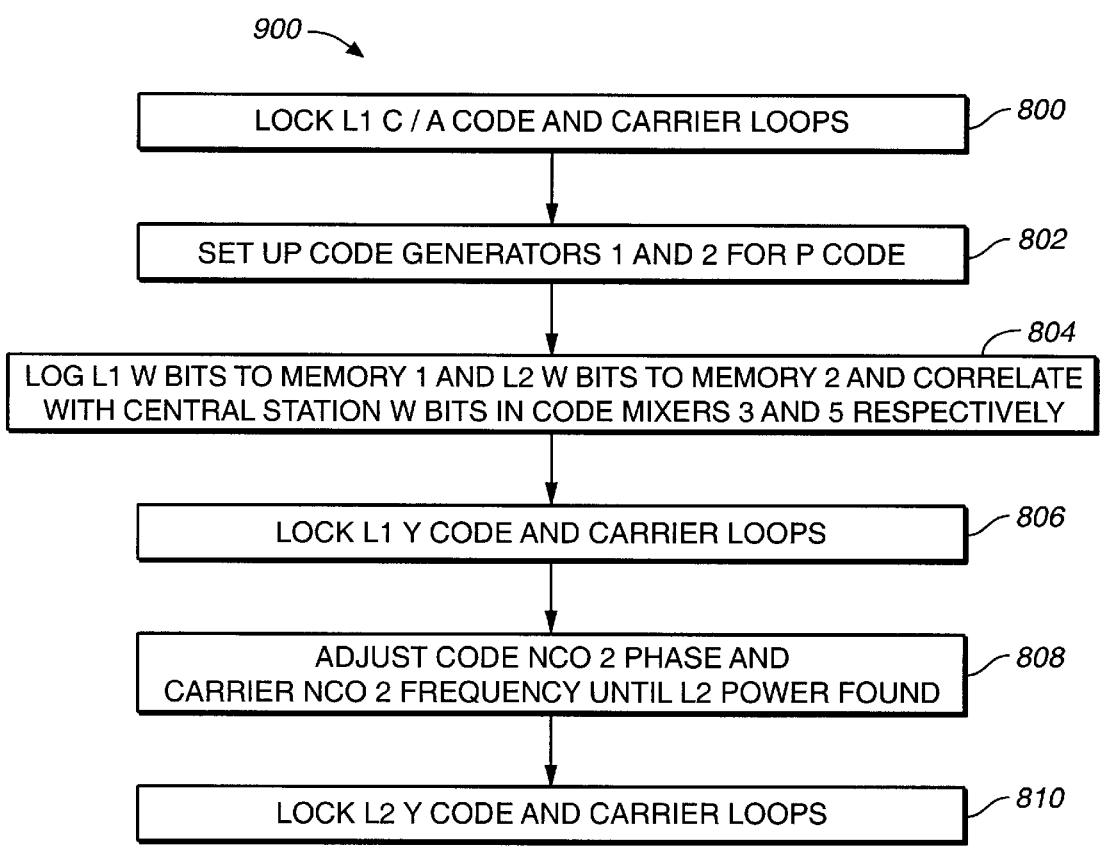
FIG._8

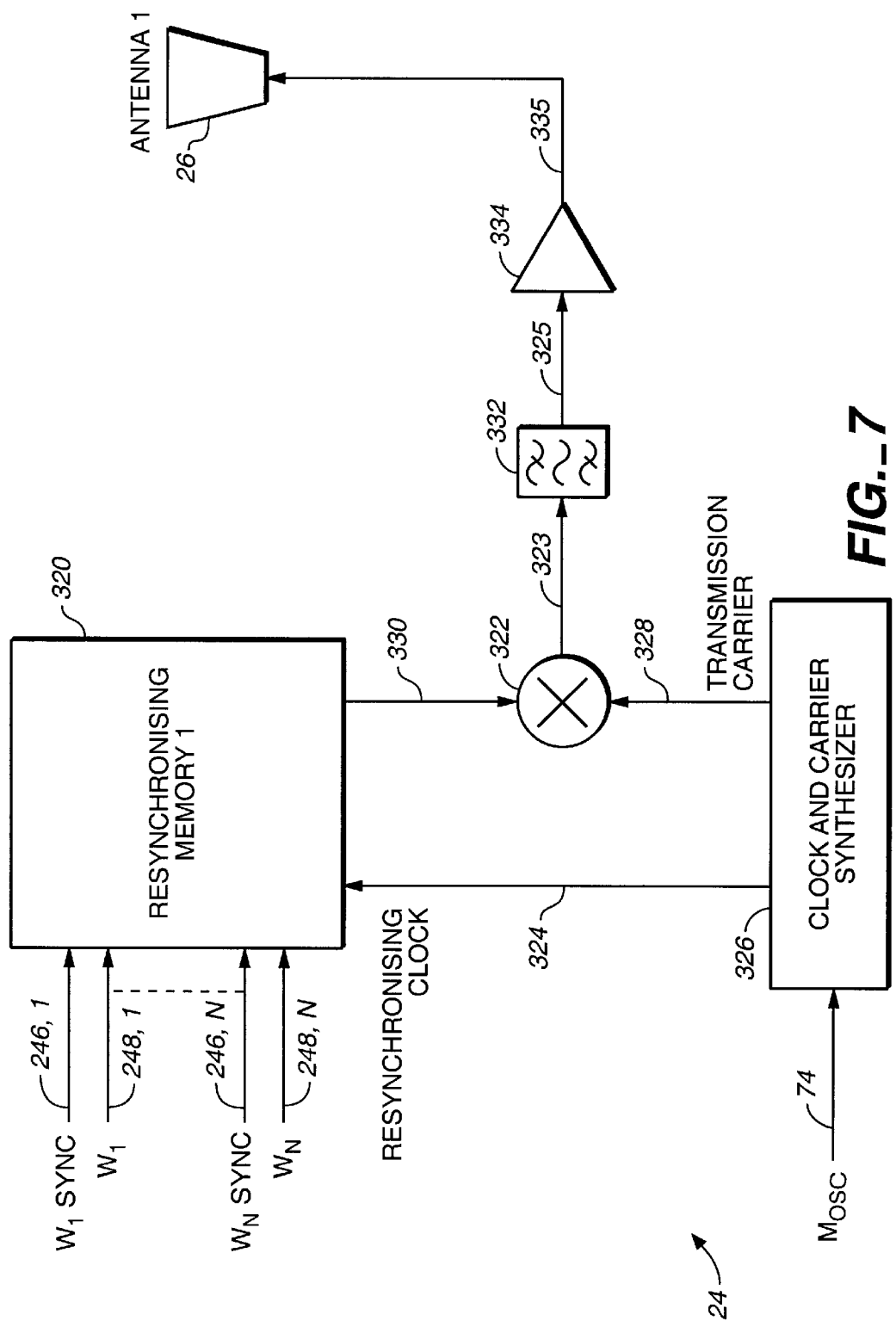

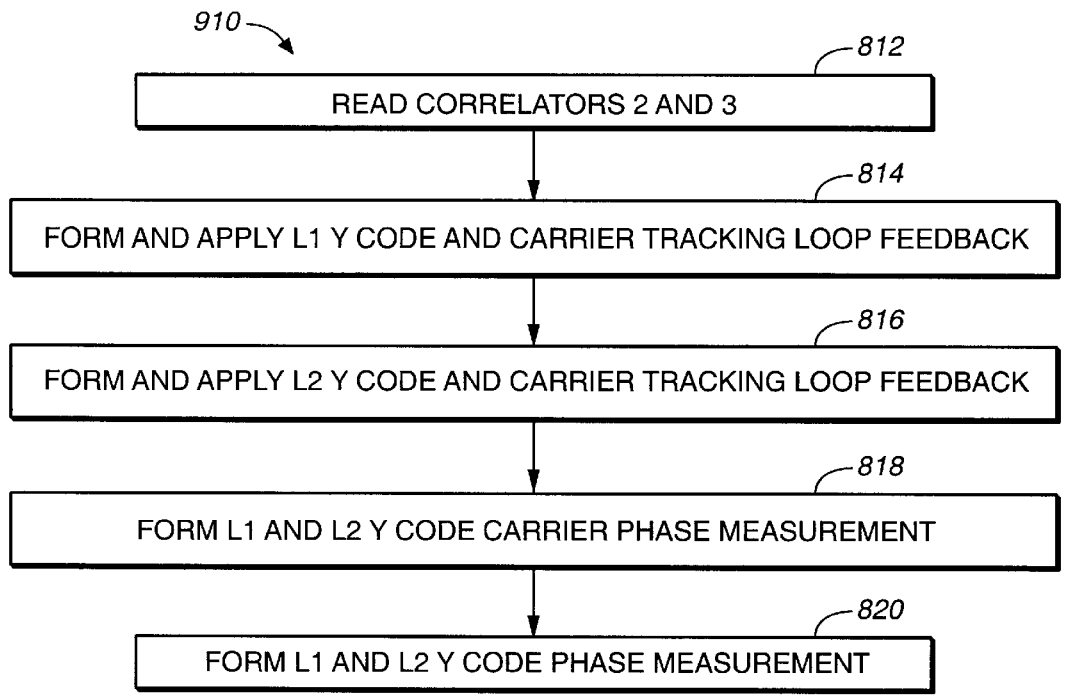
FIG._9
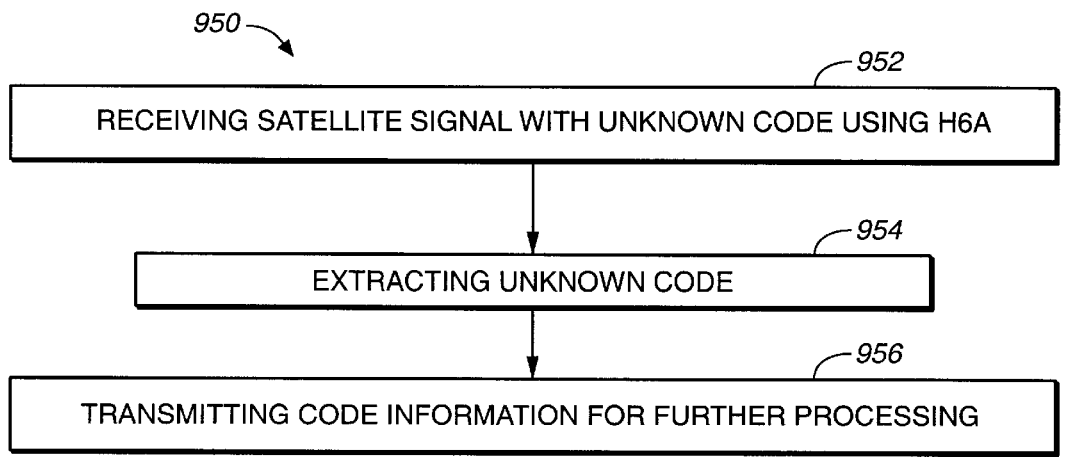
FIG._10

METHOD FOR SATELLITE TRACKING AND EXTRACTING THE SIGNAL BY CORRELATION

This is a divisional application for the U.S. patent application Ser. No. 08/580,353, filed on Dec. 28, 1995 issued as U.S. Pat. No. 5,825,887, on Oct. 20, 1998.

BACKGROUND

This invention relates to a transmitting and receiving apparatus for full code correlation operation under encryption for the Satellite Positioning System (SATPS). The SATPS includes different satellite systems. One of those systems is a Global Positioning System (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in real time by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows the usage of a plurality of GPS satellite signals for determining an observer's position and for providing the navigation information.

A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite (which includes complete information about the transmitting satellite within the next several hours of transmission) and an almanac for all GPS satellites (which includes less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in The NAVSTAR Global Positioning System, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+ 9k/16) GHz and f2=(1.246+7k/16) GHz, where k (=1,2, . . . 24) is the channel or satellite number. These frequencies lie in two bands at 1.597–1.617 GHz (L1) and 1,240–1,260

GHz (L2). The L1 code is modulated by a C/A-code (chip rate=0.511 MHz) and by a P-code (chip rate=5.11 MHz). The L2 code is modulated only by the P-code. The GLONASS satellites transmit navigational data at a rate of 50 Baud for C/A code and 100 Baud for P code. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta$ti), wherein ($\Delta$ti) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

After the SATPS receiver determines the coordinates of the i-th SATPS satellite by picking up transmitted ephemeris constants, the SATPS receiver can obtain the solution of the set of the four equations for its unknown coordinates (x0, y0, z0) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SATPS receiver.

To prevent jamming signals from being accepted as actual satellite signals, the satellites are provided with a secret Y-code, which replaces the known P-code when the "anti-spoofing" (AS) is ON. When the AS is OFF, the Y-code is turned OFF, and the known P-code (see above the cited and incorporated by reference document ICD-GPS-200) is used. Thus, the secret Y-code can be turned ON or OFF at will by the U.S. Government. The AS feature allows the GPS system to be used for the military or other classified United States Government projects. The unknown Y code is equal to the sum of the known P code and an unknown W code: Y=W+P.

The C/A code is transmitted on L1 under all conditions as it is generally required to provide timing access to L1 and L2 P(Y) code. When AS is OFF, the known P code is transmitted on both L1 and L2, allowing authorized and unauthorized users alike access to full coded receiver operation on both L1 and L2 frequencies. As it is indicated above, when AS is ON, the known P code is replaced with a secret Y code on both L1 and L2. Since the Y-code is classified, the commercial GPS users employ different techniques to recover some of the characteristics of the Y-code.

One such technique is proposed by Counselman III in U.S. Pat. No. 4,667,203, wherein the incoming signal is divided into upper and lower sidebands, which are multiplied together to obtain the second harmonic of the carrier signal. However, the degradation of the signal-to-noise ratio (SNR) is the same as with squaring the entire signal.

U.S. Pat. No. 4,972,431 issued to Keegan, discloses a different approach to the recovering of the unknown Y-code. The incoming encrypted P-code GPS signal is not immediately squared. Instead, after mixing with a local oscillator signal to lower its frequency to an intermediate frequency, the encrypted Y-code signal is correlated with a locally generated P-code signal. Since the locally generated P-code signal does not perfectly match the encrypted Y-code sequence, the correlation does not produce a sharp peak in the frequency spectrum. The result of the correlation is filtered by a bandpass filter, and the reduced-bandwidth signal is squared. Because the squaring step is performed over a narrower bandwidth than the original P-code, there is less degradation in the SNR of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve carrier integer ambiguities.

In U.S. Pat. No 5,293,170 issued to Lorenz, the modulated code period is estimated to be an integer multiple of P chips. The invention assumes the knowledge of the timing of the unknown Y-code. However, such Y-code timing information is not available to the commercial user and cannot be recovered without knowledge of the classified Y-code information.

In the existing prior art, unauthorized (and civilian) GPS users have been denied full access to the L2 signal and have been limited to full coded access of C/A code on L1. This results in subnormal signal-to-noise ratio (SNR). Full access to the L2 signal is particularly advantageous when attempting to perform accurate ionospheric measurements or corrections, and in real-time kinematic applications involving carrier cycle ambiguity searches.

What is needed is a system including a SATPS receiver capable of receiving L1/L2 signals in a substantially similar and optimal way, wherein the AS can be On, or OFF.

SUMMARY

The present invention is unique because it discloses a method and apparatus for receiving L1/L2 signals in a substantially similar and optimal way, wherein the AS can be ON, or OFF, using a high gain frequency (HGA) antenna.

One aspect of the present invention is directed to a method for observing the satellite signals coded with unknown code. The method utilizes a satellite receiving station equipped with a High Gain Antenna (HGA).

In one embodiment, the method comprises the following steps: (a) receiving the satellite signal coded with unknown code using a HGA; (b) extracting the unknown code; and (c) transmitting the unknown code for further processing.

In one embodiment, the step of receiving the satellite signal coded with unknown code using the HGA further comprises the step of receiving the GPS satellite signals coded with unknown Y code.

In one embodiment, the step (a) of receiving the GPS satellite signals coded with unknown Y code further comprises the steps of: (a1) tracking C/A L1 signal using the HGA antenna; (a2) acquiring the tracked C/A L1 signal; and (a3) synchronizing locally generated P code with the acquired C/A L1 signal.

The step (a1) of tracking the C/A L1 signal using the HGA antenna further includes the steps of: (a11) selecting a GPS satellite-vehicle (SV) to be observed, and (a12) observing the selected SV GPS by steering the HGA to azimuth and elevation of the SV.

The step (b) of extracting the unknown Y code further includes the steps of: (b1) removing P code from the incoming Y code, wherein the Y code is equal to the summation of the P code and an unknown W code; and (b2) resynchronizing the W code with a transmission frequency F, wherein the transmission frequency F is greater than or equal to the W code frequency.

In one embodiment, the step (c) of transmitting the unknown W code for further processing further includes the steps of: (c1) modulating the W code on carrier; and (c2) transmitting the modulated on carrier W code using a regular antenna to a processing station.

In another embodiment, the step (c) of transmitting the unknown W code for further processing further includes the step of (c1) transmitting the W code using a land line to a processing station.

Another aspect of the present invention is directed to an apparatus for observing the satellite signals coded with unknown code.

In one embodiment, the apparatus of the present invention includes: (1) at least one High Gain Antenna (HGA) configured to receive the satellite signal coded with unknown code; (2) an extracting receiver configured to extract the unknown code from the received satellite signal; and (3) a transmitter circuit configured to transmit the unknown code modulated on a transmission frequency.

BRIEF DESCRIPTION OF THE DRAWINGS

FIG. 1 illustrates an apparatus of the present invention (a central station) used in combination with a delayed W correlation receiver.

FIG. 2 shows a W extracting receiver.

FIG. 3 shows a digital channel processor including a W bit extractor.

FIG. 4 depicts a code generator 1.

FIG. 5 illustrates a W bit extractor.

FIG. 6 is a depiction of a W code power analysis.

FIG. 7 is an illustration of a modulated W transmitter.

FIG. 8 shows the steps of an acquisition process.

FIG. 9 is a depiction of the steps of a tracking process.

FIG. 10 is a flow chart of the method of the present invention.

FULL DESCRIPTION OF THE PREFERRED EMBODIMENT

FIG. 1 illustrates the preferred embodiment of the present invention, that is a central station 12 designed to receive the satellite signals from the GPS satellites GPS-1 (14) and the GPS-2 (16)) using the high gain antennas (HGA) (18 and 20). The HGA receives the GPS satellite signals with a significantly improved signal-to noise ratio (SNR) as compared with a conventional GPS antenna that has gain of 3 dB.

In one embodiment of the present invention each GPS satellite is tracked using a separate HGA.

The HGA can be implemented employing a parabolic dish antenna. The parabolic dish antennas suitable for the purposes of the present invention are produced by the Information Processing Systems, Inc., based in Belmont, Calif. The important characteristics of the parabolic antennas that can be utilized by the present invention (for observation frequency L1=1575.42 MHz) are given as follows: (a) antenna diameter=1.8 meters; (b) antenna gain=27 dB; (c) antenna beamwidth=7°.

The output of each HGA is fed into a W extracting receiver (22). The purpose of the W extracting receiver is to extract the W bit information from each satellite being observed. The extracted W bit streams are modulated and transmitted by the central station (12) such that they can be received by at least one delayed W correlation receiver (28).

The delayed W correlation receiver (28) correlates its own stored encrypted and normally-received using a standard GPS antenna (30) L1 and L2 signals with the HGA-received and pre-processed W code to perform measurements without requiring the secret Y (W) encryption keys.

The military purpose of the secret Y code is to prevent the authorized users from being spoofed (i.e. fooled) by unauthorized signals which attempt to mimic the satellite coding behavior. In order for such a spoofer to be effective, the spoofer must transmit the Y code signals in such a way that they arrive at the intended target around the same time as the real satellite generated signals arrive. The present invention does not facilitate the spoofing behavior. Indeed, the central station relays W code bit information observed from the satellites with a time delay which makes it impossible to use this information for spoofing purposes.

The modulated W transmitter (24) shown in FIG. 1 uses the antenna 1 (26) and employs the communication link (32) in order to transmit the W bit streams to the delayed W correlation receiver (28). The information bandwidth of the communication link should be sufficient for the expected data rate for each satellite (465 bits/C/A epoch=465 kbits per second ) for optimal operation.

The communication link can comprise: (1) a radiowave frequency band; (2) an infrared frequency band; (3) a microwave frequency band; (4) the ISM (industrial scientific medical) unlicensed operation band, wherein the ISM band range is selected from a class of frequency range consisting of 900 MHz, 2.4 GHz, and 5.8 GHz; and wherein the user can own the both ends of the ISM communication system; (5) a real time circuit switched communication link; (6) a 1.8 GHz band, wherein the 1.8 GHz band supports the personal communications services (PCS); (7) a Low Earth Orbiting Satellites (LEOS), wherein the LEOS is used to store and to forward digital packet data; (8) a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal; (9) an Advanced Mobile Phone System (AMPS) including a modem, wherein the modem is selected from a class consisting of a DSP (digital signal processor) modem, and a cellular digital packet data (CDPD) modem; and (10) a digital cellular telephone communication means, wherein the digital cellular telephone communication means includes a means of modulation of digital data over a radiolink selected from a class consisting of a time division multiple access (TDMA) system, and a code division multiple access (CDMA) system.

FIG. 2 depicts the preferred embodiment of the W extracting receiver (22) of FIG. 1. The W extracting receiver (22) of FIG. 2 employs at least one downconverter and sampler (40 and 60) and at least one digital channel processor (46 and 58) for each GPS satellite being observed.

For the first satellite being observed (the first satellite channel) the downconverter and sampler 1 block (40) frequency translates, amplifies, and digitally samples the incoming L1 GPS signal (76), providing the I (42) and Q (44) output signals which are processed by the digital channel processor 1 (46). A master oscillator 1 (72) block is present to act as the frequency source for the reference system. A frequency synthesizer 1 block (70) uses the master oscillator 1 output (74) to synthesize local oscillator and clock signals in the system. The microprocessor system 1 (52) ($\mu$P) provides the control signals (54) for the first satellite channel (50) and for the second satellite channel (51). FIG. 2 illustrates the two satellite channel system that is readily expandable to include more than two satellite channels.

For the complete discussion of the generation of the clocking signals, the filtering, low noise amplification, and digital sampling of the L1 and L2 signals, please, see the U.S. Pat. No. 5,825,887 that is incorporated herein in its entirety.

FIG. 3 is a detailed representation of a digital channel processor block (46) that processes the satellite information received from the first satellite channel of FIG. 2. One digital channel processor block is required per satellite for W code extraction. FIG. 3 represents a typical digital channel processor block that can be used for each satellite channel.

The digital channel processor block is designed for tracking L1 C/A code when Y code is ON and L1 P code when Y code is OFF. The function of this block was previously described in the U.S. Pat. No. 5,825,887.

The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The digital channel processor can track the received GPS signals having very low signal levels by using a Delay-Lock Loop. The essential element of the Delay-Lock Loop is the block (218) correlators 1, wherein the received code is multiplied by a reference code having a time offset $\tau$<T; T being a code chip interval. The code correlation is performed at 3 time points (E-early, P-punctual and L-late) on the autocorrelation function graph. The E, P, and L samples of the autocorrelation function are integrated in the block correlator 1. However, the correlator's 1 output itself is not sufficient for code tracking because it does not provide an indication of the sign of the delay error of a tracking reference signal. Therefore, in the Delay-Lock Loop the outputs of the E and L correlation are subtracted to form a correlation signal. This correlation signal in the digital channel processor becomes a number signal which is used to drive a numerically-controlled oscillator (the block (220) code NCO 1) or clock. This clock code NCO 1 (220) in turn drives the code generator 1 (228) in such a manner that if the clock is lagging in phase, the correction signal drives the clock faster and the reference code speeds up and runs in coincidence with the received signal. Thus, the reference code is tracking the received code. The epoch time ticks are then a measure of the received signal time. The digital channel processor also contains a coincident or punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than +1 code chip error. Initially the central station (12) may have little knowledge of its exact position and there may be a significant uncertainty as to the relative Doppler effect. With the C/A code there are a limited number, 1023, of code chips in the period. Thus, one needs to search a maximum of 1023 code chips. If acquisition of the C/A code of one satellite can be accomplished within acquisition time T, then the total acquisition time for N satellites can be NT if a single central station is time sequenced over the N satellites.

The W bit extractor (242) extracts the W bits (248) from the L1 W code signal (240) at the time marks generated by the W sync clocking signal (244) outputted by the code generator 1 (228).

FIG. 4 is an illustration of the code generator 1 (228) of FIG. 3. The inputs to this block are the code NCO 1 output (221) and the control signal (50) generated by the $\mu$P system 1 (52). The code NCO 1 signal is nominally at the P code rate (10.23 MHz) and is adjusted by the L1 C/A (or P) code tracking loop to maintain lock to the L1 signal. The C/A code generator (282) and the P code generator (284) are the standard shift register sequences described in the document "ICD-GPS-200" (infra) which is incorporated herein by reference. The C/A code generator produces signals C/A code (230) and epoch (222). The C/A code is the locally generated code and epoch is the repetition rate of the C/A code (1 kHz). The P code generator (284) produces the P code (236). Both C/A and P code generators can be adjusted under the control signal (50) produced by the $\mu$P (52) to generate a particular satellite's C/A and P code for any channel (i). The code generator 1 block also generates a W sync clocking signal (244) by dividing the P code clock (10.23 MHz) by 22 in the divide by 22 block (286) and by synchronizing to the C/A epoch signal. The W sync signal (244) acts as the satellite W code bit synchronizer for extracting the estimated W code bits.

FIG. 5 is a depiction of the W bit extractor 1 (242) of FIG. 3. The L1 W signal (240), which represents the samples of the L1 W code, are integrated across the W code bit period in the block W bit extractor 1 using the W sync clocking signal (244). The output of the W bit extractor provides an estimate '1' or '0' of the satellite's W code. The estimated W code bit has a high probability of being correct bit because the central station (12 of FIG. 1) employs the HGA in order to receive the encrypted satellite signals. An adder (300) and a latch 1 (302) form an accumulator that accumulates across the W bit period W sync. The accumulated signal is transferred to the output $W_i$ (248) by clocking latch 2 (304) on the W sync signal.

The output of the digital channel processor is the W code bit, integrated across 22 P(Y) clocks, from the satellite being tracked. As long as the actual W code clocking rate is not constantly 90° out of phase with W sync, the W bit extractor is able to extract energy from the satellite being tracked.

FIG. 6 illustrates the power analysis of the W code. According to the power analysis, the W code has a dominant clock frequency at 22 P(Y) chips, aligned with the C/A code epoch. It follows, that an 'integrate and dump' circuit (realized in the W bit extractor) synchronized to the C/A epoch and running at a rate of 22 P(Y) chips will provide the optimal estimation of W code bits even though the actual W code rate remains unknown.

FIG. 7 shows the preferred embodiment of the modulated W transmitter block (24) of FIG. 1. In this block the W code bit estimates are clocked into the resynchronising memory 1 block (320) at a rate of W sync for each satellite being observed. The purpose of the resynchronising memory 1 block (320) is to allow the W bits to be formatted and clocked at a different rate, a rate conducive to effective transmission rate. The resynchronising clock rate (324) is provided by the clock and carrier synthesizer (326).

In one embodiment, the reformatted W bits (330) are mixed with the transmission carrier (328) in the mixer (322), filtered in the filter (332), amplified in the amplifier (334), and transmitted to the delayed W correlation receiver (block 28 of FIG. 1) using the antenna 1 block (26) for further processing.

The resynchronising memory 1 block (320) can also be used to add a time tag to the transmission such that the delayed W correlation receiver can know which GPS millisecond each W code section belongs to, thus allowing alignment with its observed W code. The time tagging is not necessary if the transmission time is fixed and known, although a time tag would be advantageous for direct Y code acquisition (without having to lock to L1 C/A code first).

The L1 acquisition process involves locking to the L1 C/A code signal first. Once the locally generated P code has been set up using timing information from the L1 C/A code tracking loop, the code and carrier tracking loops which were formed from the L1 C/A signal can be formed from the L1 Y code signal. Further use of L1 Y code tracking is useful in mitigating multipath effects (as Y code has a narrower chip width than C/A code) and in jamming environments. The technique also provides an anti-spoofing benefit as long as the communication link from the central station is secured.

The biggest benefit of the delayed W code correlation technique is found when tracking the L2 Y code signal. When encrypted, L1 still transmits the C/A code and thus measurements may be made with this signal. On the other hand, when encrypted, the L2 signal only provides L2 Y code.

FIG. 8 and FIG. 9 describe the software acquisition (900) and tracking (910) modes respectively.

In the acquisition mode (900), the L1 C/A code is locked in the code and carrier tracking loops (step 800). The step (802) is the set up of the code generators (1 and 2) for generation of the local P code. The following step (804) is the initiation of the logging process of L1 W bits into memory 1 and L2 W bits into memory 2 and performing the correlation process with the transmitted from the central station W bits. After the L1 Y code and carrier loops are locked (step 806), the code NCO 2 phase and carrier NCO 2 frequency are adjusted until L2 power is found (step 808), and the L2 Y code and carrier loops are locked (step 810). Thus, the acquisition mode is completed.

The tracking mode (910 of FIG. 9) follows the acquisition of the satellite signals.

At first, the correlators (2 and 3) are read (step 812). Secondly, the L1 Y and L2 Y code and carrier tracking loop feedbacks are formed and applied (step 814 and step 816). This allows to perform the L1 and L2 Y code carrier phase measurements (step 818) and the L1 ad L2 code phase measurements (step 820). This completes the tracking mode of operation.

FIG. 10 depicts a flow chart (950) of a method for observing satellite signals coded with unknown code in general terms. The method utilizes a satellite receiving station equipped with a High Gain Antenna (HGA).

In step (952), the satellite signal coded with unknown code is received using the HGA. After the unknown code is extracted (step 954), the coded information is transmitted (step 956) for further processing in the processing station.

In the preferred embodiment, the step of receiving the satellite signal coded with unknown code using the HGA further comprises the step of receiving the GPS satellite signals coded with unknown Y code.

In this embodiment, the step of receiving the GPS satellite signals coded with unknown Y code further comprises the steps of: (a) tracking C/A L1 signal using the HGA antenna; (b) acquiring the tracked C/A L1 signal; and (c) synchronizing locally generated P code with the acquired C/A L1 signal.

The step of extracting the unknown Y code further includes the steps of: removing P code from the incoming Y code, and resynchronizing the W code with a transmission frequency F, wherein the transmission frequency F is greater than or equal to the W code frequency.

In one embodiment, the step of transmitting the unknown W code for further processing further includes the steps of: modulating the W code on carrier, and transmitting the modulated on carrier W code using a regular antenna to a processing station.

In another embodiment, the step of transmitting the unknown W code for further processing further includes the step of transmitting the W code using a land line to a processing station.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method for observing the satellite signals coded with unknown code, said method utilizing a satellite receiving station equipped with a High Gain Antenna (HGA), said method comprising the steps of:

receiving the satellite signal coded with unknown code using said HGA;

extracting said unknown code; and transmitting said unknown code for further processing.

2. The method of claim 1, wherein said step of receiving the satellite signal coded with unknown code using said HGA further comprises the step of receiving the GPS satellite signals coded with unknown Y code.

3. The method of claim 1, wherein said step of receiving the GPS satellite signals coded with unknown Y code further comprises the steps of:
   tracking C/A L1 signal using said HGA antenna;
   acquiring said tracked C/A L1 signal; and
   synchronizing locally generated P code with said acquired C/A L1 signal.

4. The method of claim 1, wherein said step of receiving the GPS satellite signals coded with unknown Y code further comprises the steps of:
   tracking C/A L1 and C/A L2 signals using said HGA antenna;
   acquiring said tracked C/A L1 and C/A L2 signals; and
   synchronizing locally generated P code with said acquired C/A L1 and C/A L2 signals.

5. The method of claim 3, wherein said step of tracking said C/A L1 signal using said HGA antenna further includes the steps of:
   selecting a GPS satellite-vehicle (SV) to be observed; and
   observing said selected SV GPS by steering said HGA to azimuth and elevation of said SV.

6. The method of claim 2, wherein said step of extracting said unknown Y code further includes the steps of:
   removing P code from said incoming Y code, wherein said Y code is equal to the summation of said P code and an unknown W code; and
   resynchronizing said W code with a transmission frequency F, wherein said transmission frequency F is greater than or equal to the W code frequency.

7. The method of claim 2, wherein said step of transmitting said unknown W code for further processing further includes the steps of:
   modulating said W code on carrier; and
   transmitting said modulated on carrier W code using a regular antenna to a processing station.

8. The method of claim 2, wherein said step of transmitting said unknown W code for further processing further includes the step of:
   transmitting said W code using a land line to a processing station.

9. An apparatus for observing the satellite signals coded with unknown code, said apparatus including:
   a High Gain Antenna (HGA) configured to receive the satellite signal coded with unknown code;
   an extracting receiver configured to extract said unknown code from the received satellite signal; and
   a transmitter circuit configured to transmit said unknown code modulated on a transmission frequency.

* * * * *